United States Patent
Onoro-Rubio et al.

(10) Patent No.: US 10,810,723 B2
(45) Date of Patent: Oct. 20, 2020

(54) SYSTEM AND METHOD FOR SINGLE IMAGE OBJECT DENSITY ESTIMATION

(71) Applicant: NEC Laboratories Europe GmbH, Heidelberg (DE)

(72) Inventors: Daniel Onoro-Rubio, Heidelberg (DE); Mathias Niepert, Heidelberg (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 124 days.

(21) Appl. No.: 16/191,581

(22) Filed: Nov. 15, 2018

(65) Prior Publication Data

US 2019/0147584 A1    May 16, 2019

Related U.S. Application Data

(60) Provisional application No. 62/586,243, filed on Nov. 15, 2017.

(51) Int. Cl.
*G06K 9/00* (2006.01)
*G06T 7/00* (2017.01)
(Continued)

(52) U.S. Cl.
CPC ............ *G06T 7/0002* (2013.01); *G06F 17/11* (2013.01); *G06K 9/00771* (2013.01);
(Continued)

(58) Field of Classification Search
CPC ......... G06T 7/0002; G06T 7/246; G06T 7/10; G06T 7/11; G06T 9/002; G06T 2207/30242; G06T 2207/20084; G06T 2207/20081; G06T 7/0012; G06T 7/62; G06T 2207/30004; G06F 17/11; G06K 9/00771; G06K 9/3233; G06K 9/6267; G06K 9/00778; G06K 9/00362;
(Continued)

(56) References Cited

U.S. PATENT DOCUMENTS

9,240,051 B2    1/2016   Liu et al.
2008/0118106 A1    5/2008   Kilambi et al.
(Continued)

FOREIGN PATENT DOCUMENTS

WO    WO-2019002474 A1 *   1/2019   ........... G06K 9/6262

OTHER PUBLICATIONS

Ronneberger, et al., "U-Net: Convolutional Networks for Biomedical Image Segmentation," *Serious Games*: 1-8 (Jan. 1, 2015), XP055552088.

Waithe, "Feb. 5, 2019 GitHub-dwaithe/U-net-for-density-estimation," (Nov. 7, 2017), XP055551996.

Weidi Xie, et al., "Microscopy Cell Counting and Detection with Fully Convolutional Regression Networks," *Computer Methods in Biomechanics and Biomedical Engineering: Imaging & Visualization*, 6 (3): 283-292 (Aug. 1, 2015), XP055551869.

(Continued)

*Primary Examiner* — Jose L Couso
(74) *Attorney, Agent, or Firm* — Leydig, Voit & Mayer, Ltd.

(57) ABSTRACT

A method for object density monitoring includes receiving, by a processing server, an input image captured by an image sensor. The method further includes providing an annotated dataset with a target object to be identified in the input image, and providing, by the processing server as output, an object density map generated from the input image. The processing server provides the object density map by using a deep neural network having one or more pairs of a compression layer and a decompression layer connected by gated shortcuts.

20 Claims, 4 Drawing Sheets

(51) Int. Cl.
  *G06K 9/32* (2006.01)
  *G06F 17/11* (2006.01)
  *G06N 3/08* (2006.01)
  *G06K 9/62* (2006.01)
  *G06N 3/04* (2006.01)

(52) U.S. Cl.
  CPC ......... *G06K 9/3233* (2013.01); *G06K 9/6267* (2013.01); *G06N 3/0454* (2013.01); *G06N 3/0481* (2013.01); *G06N 3/08* (2013.01); *G06N 3/084* (2013.01); *G06T 2207/30242* (2013.01)

(58) Field of Classification Search
  CPC .... G06K 9/00785; G06K 9/3241; G06K 9/00; G06K 9/00664; G06K 9/6256; G06K 9/4628; G06N 3/0481; G06N 3/08; G06N 3/084; G06N 3/0454; G06N 3/0445; G06N 3/0472; G06N 3/082; G06N 3/045; G06N 3/04; G06N 20/00; G06N 3/088; G06N 20/20; H04N 7/18; G06M 11/00; G10L 15/16; G10L 25/30; A61B 5/7267; A61B 5/7203; A61B 8/5207; A61B 8/5269; G01N 33/5005; G16B 40/30
  See application file for complete search history.

(56) References Cited

U.S. PATENT DOCUMENTS

| | | | |
|---|---|---|---|
| 2016/0358027 A1 | 12/2016 | Hotta et al. | |
| 2018/0177461 A1* | 6/2018 | Bell | A61B 5/7267 |
| 2018/0218256 A1* | 8/2018 | Raviv | G06N 3/088 |
| 2018/0336884 A1* | 11/2018 | Sriram | G10L 15/183 |
| 2019/0026639 A1* | 1/2019 | Vasudevan | G06N 3/08 |
| 2019/0030371 A1* | 1/2019 | Han | G06T 7/11 |
| 2019/0057515 A1* | 2/2019 | Teixeira | A61B 90/39 |
| 2019/0384047 A1* | 12/2019 | Johnson | G02B 21/008 |
| 2020/0097701 A1* | 3/2020 | Chukka | G06K 9/6274 |

OTHER PUBLICATIONS

Deepak Babu Sam, et al., "Switching Convolutional Neural Network for Crowd Counting," *IEEE Computer Society Conference on Computer Vision and Pattern Recognition. Proceedings*: 4031-4039 (Jul. 1, 2017), XP055551846.

Onoro-Rubio, et al., "Learning Short-Cut Connections for Object Counting," (May 8, 2018), XP055552420.

Rupesh Kumar Srivastava, et al., "Highway Networks", arXiv:1505.00387v2 [cs.LG], Nov. 3, 2015, pp. 1-6.

* cited by examiner

SYSTEM AND METHOD FOR SINGLE IMAGE OBJECT DENSITY ESTIMATION

CROSS REFERENCE TO RELATED APPLICATIONS

This application claims benefit to U.S. Provisional Patent Application No. 62/586,243, filed Nov. 15, 2017, which is hereby incorporated by reference herein.

STATEMENT OF FUNDING

The project leading to this application has received funding from the European Union's Horizon 2020 research and innovation programme under grant agreement No 761508.

FIELD

The invention relates to image processing and analysis, and more particularly, to object density estimation in images.

BACKGROUND

Counting objects in images is an important problem with numerous applications. Counting people in crowds, cells in a microscopy image, or vehicles in a traffic jam are typical instances of this problem. Computer vision systems that automate these tasks have the potential to reduce costs and processing time of otherwise labor intensive tasks An intuitive approach to object counting is through object detection. The accuracy of object localization approaches, however, rapidly deteriorates as the density of the objects increases. Thus, methods that approach the counting problem as one of object density estimation, have been shown to achieve state-of-the-art results. The object density estimation and counting problem consist in localizing and counting the number of occurrences of a particular object type such as, e.g., cars, people, cells, etc. Typically a sensor camera placed in a fix location detects changes in an input stream, then they are used to estimate the number of objects.

In U.S. Pat. No. 9,240,051, a video stream is used as input to compute the optical flow, and a set of handcraft features to perform the object count. In U.S. Patent Application Publication No. 2008/0118106, a camera is placed in a fixed position and is calibrated with the ground plane and a video stream is also expected to perform the background segmentation based on the frame changes. The estimation is done base on some predefined parameters of the calibration and the area of the detected foreground. U.S. Patent Application Publication No. 2016/0358027 uses a similar technique. Based on a video stream the body contours are detected and based on the area coverage and the camera setting parameters the total amount of objects is calculated and displayed.

SUMMARY

In an embodiment, the present invention provides a method for object density monitoring. The method includes receiving, by a processing server, an input image captured by an image sensor. The method further includes providing an annotated dataset with a target object to be identified in the input image, and providing, by the processing server as output, an object density map generated from the input image. The processing server provides the object density map by using a deep neural network having one or more pairs of a compression layer and a decompression layer connected by gated shortcuts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Figure 1:
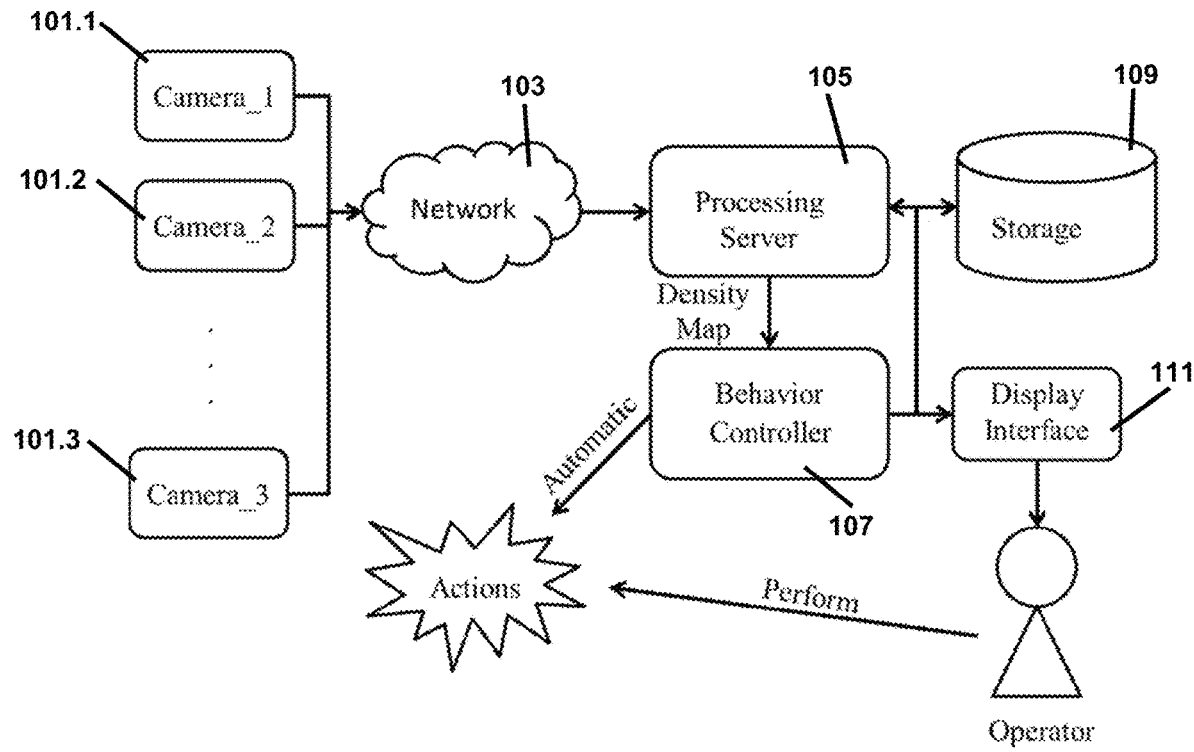
FIG. 1 illustrates an overview of a system according to an embodiment of the invention.

Use of a video stream is a strong requirement of the prior art and constrains the scalability of such systems. Moreover, most prior art systems and methods require a calibration or parameter acquisition of the scene where the camera is located. Embodiments of the present invention can substantially enhance the scalability of systems and methods for estimation of object density by enabling operation on independent still images instead of video streams. Furthermore, embodiments of the present invention can operate without prior calibration of the scene where the images are recorded thereby facilitating deployment in a wider array of circumstances.

Embodiments of the invention include methods and systems for image object density location and counting. Embodiments of the present invention provide systems and methods that can perform object density estimation based on one or more collected single images, i.e. still images. According to an embodiment, a system includes a camera that monitors a scene that may contain a target object. The camera collects images that are analyzed by a processing server. A neural network, e.g. a gated, deep, fully convolutional neural network, generates object density maps corresponding to the collected images. Those density maps can be used to monitor the concentration of a particular object in the target scene, to collect statistics, and/or to launch warnings or to take actions, e.g. if the concentration of objects exceeds or falls below a predefined threshold.

According to embodiments of the invention, methods for object density monitoring is provided. The methods include providing an image sensor configured to provide a view of a target scene, connecting the image sensor to a processing server via a communication network, and receiving, by the processing server, an input image captured by the image sensor. The methods further include providing an annotated dataset with a target object to be identified in the input image, and providing, by the processing server as output, an object density map generated from the input image. The processing server provides the object density map by using a deep neural network having one or more pairs of a compression layer and a decompression layer connected by gated shortcuts.

According to embodiments of the invention, the object density map is a heat map that indicates a number of instances of the target object in different regions of the input image.

According to embodiments of the invention, methods are provided that further include, prior to the receiving, by the processing server, the input image captured by the at least one image sensor, training the deep neural network using the annotated dataset.

According to embodiments of the invention, during the training the deep neural network using the annotated dataset, a connection strength of each of the one or more gated shortcuts is learned. Each of the one or more gated shortcuts can receive, as input, a feature vector and provide, as output, a mask that is multiplied by the feature vector. The mask can be generated by a sigmoid function of the feature vector and a set of learned weights. The weights can be learned during training of the deep neural network using the annotated dataset.

According to embodiments of the invention, methods are provided that further include providing a total count of a number of instances of the target object in the input image.

According to embodiments of the invention, the image sensor is a camera and/or a microscope, and the input image captured by the image sensor is a still image.

According to embodiments of the invention, methods further provide a plurality of one or more additional image sensors configured to provide a view of the target scene. According to embodiments of the invention, methods are provided that further include connecting the one or more additional image sensors to the processing server via the communication network, receive, by the processing server, one or more additional input images captured by the one or more additional image sensors, and provide, by the processing server as output, one or more additional object density maps, wherein each of the one or more additional object density maps is generated from a respective one of the one or more additional input image. Such methods can further include providing a total count of a number of instances of the target object in the target scene by considering the object density map and each of the one or more additional object density maps.

According to embodiments of the invention, non-transitory computer readable media having stored thereon instructions for performing a method for object density monitoring are provided. The method includes providing an image sensor configured to provide a view of a target scene, connecting the image sensor to a processing server via a communication network, and receiving, by the processing server, an input image captured by the image sensor. The method further includes providing an annotated dataset with a target object to be identified in the input image, and providing, by the processing server as output, an object density map generated from the input image. The processing server provides the object density map by using a deep neural network having one or more pairs of a compression layer and a decompression layer connected by gated shortcuts.

According to embodiments of the invention, a system for object density monitoring is provided. The system includes an image sensor configured to provide a view of a target scene and to capture an input image and a processing server. The processing server is configured to: receive the input image from the image sensor via a communication network, receive an annotated dataset with a target object to be identified in the input image, and provide, as output, an object density map generated from the input image. The processing server provides the object density map by using a deep neural network having one or more pairs of a compression layer and a decompression layer connected by gated shortcuts.

FIG. 1, illustrates an overview of a system according to an embodiment of the invention. The system illustrated in FIG. 1 includes one or more cameras 101.1, 101.2, and 101.3. In alternative embodiments, other types of image sensors capable of capturing images can be used. The one or more cameras or other image sensors are placed in positions (though not necessarily fixed positions) where they can monitor a certain scene. The system illustrated in FIG. 1 further includes a communication network 103 connecting the cameras 101.1, 101.2, and 101.3 to a processing server 105. Images collected by the cameras 101.1, 101.2, and 101.3 are transmitted through the communication network 103 to the processing server 105. The processing server 105 is configured to convert the images into density maps using a gated, deep, fully convolutional neural network. The system illustrated in FIG. 1 additionally includes a behavior controller 107 configured to receive the density maps from the processing server, to analyze the density maps, and based on a set of predefined rules, automatically perform a set of predefined actions. In addition, the behavior planner can collect statistical information and logs and store such statistical information and logs in storage 109. The system also includes a display interface 111 configured to display information obtained by the processing server 105 and/or the behavior controller 107 to an operator thereby allowing the operator to supervise the process and to perform additional actions if necessary.

In the system illustrated in FIG. 1, each of the processing server 105 and the behaviour controller 107 is itself or can be hosted by one or more physical machines each including compute resources, storage resources, and network resources—or a component thereof (e.g. the behaviour controller 107 can be a physical machine, a virtual machine (VM), or collection of VMs hosted by one or more physical machines). The compute resources of the physical machines include one or more processors each having one or more processor cores. The storage resources can include computer readable memory, e.g., random-access-memory (RAM) and/or cache memory. The network resources can include, e.g., a physical network interface controller (NIC) and a bus that couples various system components, e.g. the processors and the computer readable memory, together.

The density maps generated by the processing server can be, e.g., heat maps that indicate a number of objects in different regions of the input image. Therefore, given an image x in the form of $X \in R^{[h,w,c]}$ (where h, w, and n are, respectively, the height, width and number of channels of the image), the total object count n can be calculated as:

$$n = \text{integral}(d(x)),$$

where d(x) is the density map of the image x. Hence, given an input image x, a density map d(x) can be generated by using a neural network, e.g. a gated, deep, fully convolutional neural network.

In generating density maps, embodiments of the present invention use neural networks having learnable short-cut connections. Short-cut connections are connections between layers that skip at least one intermediate layer. There is an increasing body of work on short-cut connections (sometimes also referred to as skipconnections) in deep neural networks. Examples of architectures with short-cut connections are: highway and residual networks, DenseNets, and U-Nets. While clear benefits of these connections have been shown repeatedly, the exact reasons for their success are still not fully understood. Short-cut connections allow very deep networks to be trained by facilitating a more direct flow of information between far apart layers during backpropagation. A more recent and complementary explanation is that networks with short-cut connections behave similar to ensembles of shallower networks.

Embodiments of the present invention provide a framework for fine-grained learning of the strength of short-cut connections. More specifically, embodiments of the present invention provide gating mechanisms that can be applied to any deep neural network (DNN) to learn short-cuts from the training data thereby optimizing the flow of information between earlier and later layers (e.g. convolutional and deconvolutional layers) of the architecture.

A DNN can be defined as a function approximator that maps feature tensors to output tensors, e.g. $y = F_w(x)$ where W represents the parameters of the DNN. A DNN $F_w(x)$ can be written as a composition of functions $F_w(x) = f_{W_n}^{no} \ldots f_{W_2}^{2} \circ f_{W_1}^{1}(x)$, where each $f_{W_i}^{i}$ represents the transformation function for layer $i \in \{1, \ldots, n\}$ with its parameters $W_i$. Each such layer maps its input to an output tensor $z_i$. The output tensor $z_i$ is a feature map that maps certain features to the input. In other words, each layer of the neural network can be said to be a "feature extractor." Typically, the output $z_i$ of layer i is used as input to the following layer $f_{W_{i+1}}^{i+1}(z_i)$ to generate output $z_{i+1}$, and so on. Each layer, therefore, is only connected locally to its preceding and following layer. However, shortcuts enable the output of a layer i to be connected to the input of a layer j (where j>i+1). Embodiments of the invention not only create certain shortcut connections but also learn their connection strength using a gated short-cut unit, as illustrated in FIGS. 2 and 3 below.

Figure 2:
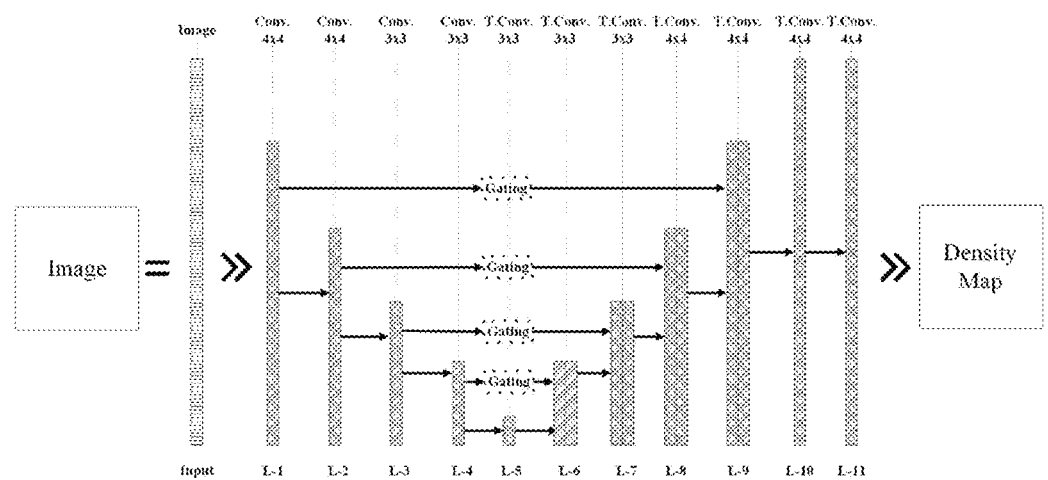
FIG. 2 illustrates a neural network architecture according to an embodiment of the invention.
Figure 3:
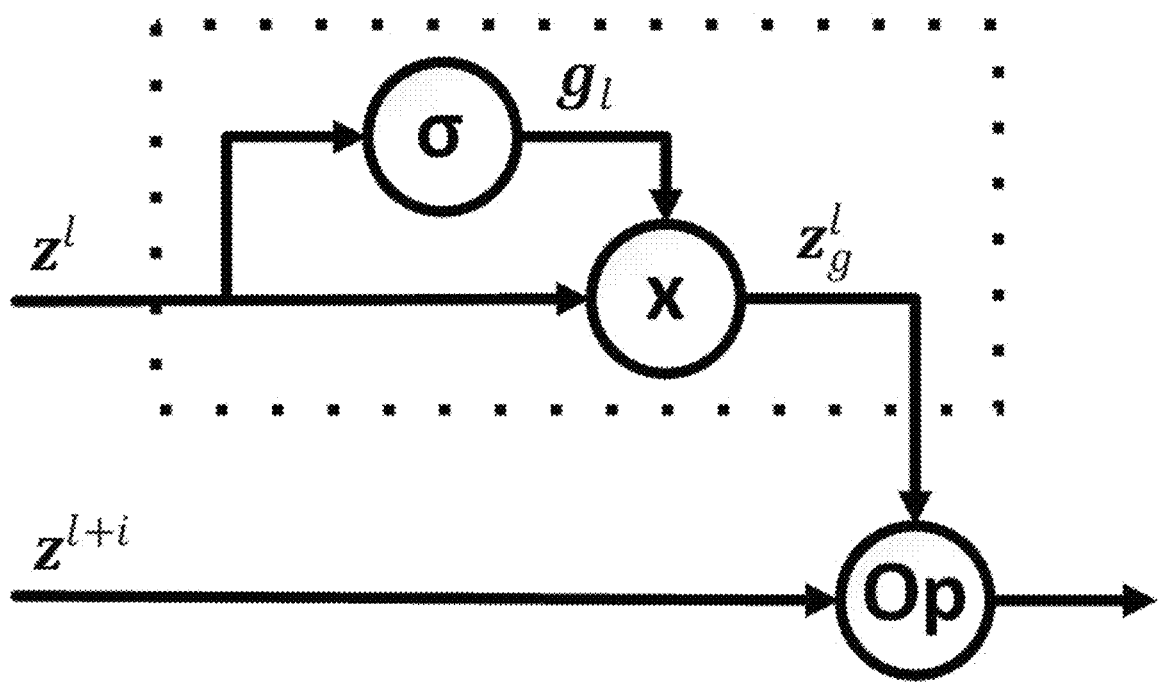
FIG. 3 illustrates a gating operation provided in a shortcut connection between layers in a neural network architecture according to an embodiment of the invention.

FIG. 2 illustrates a neural network architecture according to an embodiment of the invention. The architecture according to the embodiment of the invention illustrated in FIG. 2 can be referred to as a Gated UNet (GU-Net) and can be used, e.g. by the processing server 105 of FIG. 1, to generate, from an input image, a heat map corresponding to the input image. Various alternative embodiments of the invention may provide GU-Net neural network architectures that differ from that depicted in FIG. 2 in terms of number of layers, filter sizes, strides, and activation functions but that nevertheless generate object density maps for counting problems.

The GU-Net neural network illustrated in FIG. 2 is a fully convolutional neural network that consists of 11 layers. The first five layers are convolutional layers that correspond to a compression part, the following five layers are transpose-convolutional layers configured to perform decompression (which can also be referred to as construction), and finally, the eleventh layer is an output layer. The convolutional layers can also be referred to as compression layer, and the transpose-convolutional layers can also be referred to as decompression layers. The first convolutional layer has 64 filters of [4; 4] (where [4; 4] is the kernel size, i.e. a 4×4 matrix), the second convolutional layer has 128 filters of [4; 4], and the third, fourth and fifth layer have 128 filters of [3; 3]. In all the previous layers, a stride of [2; 2] is used to reduce the size of the features by half. The remaining layers use the transpose-convolution. The sixth and seventh layers have 128 filters with a size of [3; 3], the eighth and ninth layers have 128 filters of [4; 4]. The tenth has 64 filters with a size of [4; 4] in order to match the first convolutional layers. In all of the expansion layers, a stride of [2; 2] is used, which doubles the size of the feature maps. As the activation function, we make use of the Leaky ReLu. The eleventh layer is the output layer. In this layer we use a transpose-convolution with a single filter, the size of [4; 4], and a stride of [1; 1]. This operation does not perform any up-sampling; it produces an output of the model and does not require any activation function. Also, notice that for this eleventh layer the usage of the convolution or the transpose-convolution is equivalent.

In the GU-Net neural network architecture illustrated in FIG. 2, short-cuts connect corresponding compression and decompression (expansion) layers—which have the same feature map size. Specifically, the first layer connects with the ninth layer, the second layer connects with the eighth layer, the third layer connects with the seventh layer, and the fourth layer connects with the sixth layer. Each short-cut includes a gating operation configured to learn which information should be passed between the layers connected thereby.

FIG. 3 illustrates a gating operation provided in a short-cut connection between layers in a neural network architecture according to an embodiment of the invention. The gating operation is performed by a learned sigmoid layer that receives, as input, the features that are output into the short-cut and provides, as output, a mask that is multiplied by the input to decide which information should be passed. Naming $z^l$ as the information that flows in through the short-cut (i.e. the information that is output by layer l), a set of weights $W_g$ is learned so as to produce a mask g:

$$g = \sigma(z^l | W_g)$$

where σ is the sigmoid function. Then, $z_g^l$ corresponds to the gated information which is the results of the pointwise multiplication between g and $z^l$:

$$z_g^l = z^l \odot g$$

As can be seen in FIG. 3, the input to a particular layer (designated in FIG. 3 by "Op") is the output $z_{l+i}$ of a neighboring layer l+i and the gated information $z_g^l$ output by the shortcut.

The short-cut connection between layers in a neural network architecture according to an embodiment of the invention can alternatively be described as follows. The output of a layer l (i.e.: $z^l$) is used to compute gating scores g by the operation $\sigma(z_l | W_g)$. Then, the gated version (i.e.: $z_g^l$) is computed by the point-wise multiplying $g \odot z^l$. The resulting tensor, is merged with $z^{l+i}$ with some operation such as the concatenation, summation, etc.

Neural networks according to embodiments of the invention can be easily trained to generate density maps of a target object by using, during the training, an annotated dataset where objects are localized by a single dot. The density maps generated by embodiments of the invention can then be used to provide a total count of the number of instances of the target object in the image. In training the neural networks according to embodiments of the invention, a multivariate regression task is solved wherein the network is trained to minimize a squared difference between a prediction (i.e. the output of the neural network for a given input image) and a ground truth (i.e. a predetermined density map for the input image that represents a desired output). The loss function used in training the neural network can have the form $J(y,x) = \|y - F_w(x)\|_2$, wherein $F_w(x)$ corresponds to the prediction of the neural network and y corresponds to the ground truth. In contrast to most prior art (which requires the use of multiple loss functions in training), embodiments of the invention can achieve state-of-the-art performance with just a single loss term.

In GU-Net neural network architectures according to embodiments of the invention, the gating units act as bitwise soft masks that determine an amount of information to pass via the short-cut connections between respective layers, so as to improve the quality of the feature maps. In a DNN, the first layers are specialized in detecting low-level features such as edges, textures, colors, etc. These low-level features are needed in a normal feed-forward neural network, but when they are combined with deeper features, they might or might not contribute to the overall performance. For this reason, the gating units are specially useful to automate the feature selection mechanism for improving the short-cut connections, while strongly back propagating the updates to the early layers during learning.

The gating units do not add more freedom to the neural network but do add additional parameters (one additional convolutional layer per short-cut connection). Therefore, the fitting capability of GU-Net is the same as an original U-Net (a class of neural network architectures which can be divided into a compression part and a decompression part and that have standard short-cut connections). The short-cut connections help to efficiently propagate the gradient signal to the input layers. This allows the network to learn stably and efficiently. In contrast, prior art systems and methods make use of secondary losses, e.g. a number of objects classification in order to make the training stable. Adding a secondary loss requires the addition of a second label during the training and also requires that the network solve a secondary task during the training. As a result, the network is not just focused solely on density map estimation. As a result, performance may be negatively impacted. The gating mechanism provided according to embodiments of the invention allows an analysis of whether the information that is transferred via the short-cut is relevant or irrelevant for density map estimation. Information that is potentially noisy or irrelevant can thereby be blocked. The neural network models that result are, as a result, robust to certain noisy patterns. Therefore, it is not that crucial to pretrain the neural network models provided according to embodiments of the invention (e.g. on a large dataset such as ImageNet) and then continue the training for a target task. In this manner, the gating strategy provided according to embodiments of the present invention provides more robust models that produce better results.

Embodiments of the present invention can be designed to run on images with multiple resolutions and can be extremely efficient. Only using convolutions allows the system to be automatically adaptive to the aspect ratio of an image without having to be retrained. An embodiment of the invention achieved a running time on a graphics processing unit of only 23 ms on a three-channel image of 640×480 pixels.

Figure 4:
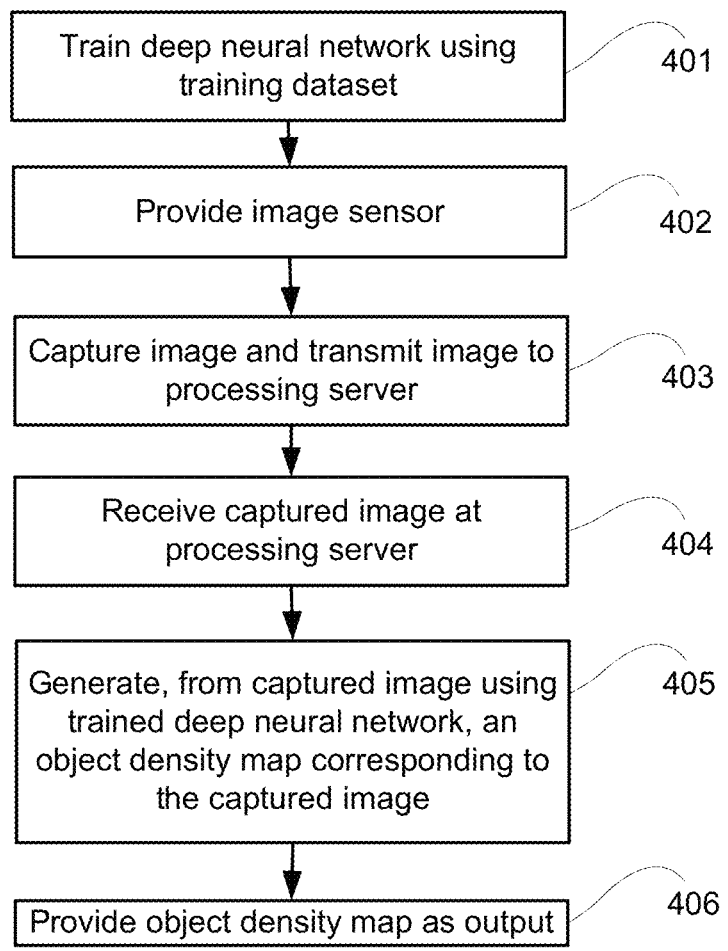
FIG. 4 illustrates a method for determining a density of objects in an image according to an embodiment of the invention.

FIG. 4 illustrates a method for determining a density of objects in an image according to an embodiment of the invention. At 401, a deep neural network executed by a processing server and having one or more pairs of a compression layer and a decompression layer connected by gated shortcuts is trained using an annotated dataset. The annotated dataset has a target object to be identified in an input image. At 402, an image sensor is provided. At 403, the image sensor captures an image and transmits the image to a processing server via a communication network. At 404, the processing server receives the image. At 405, the processing server generates, from the captured image using the trained deep neural network, an object density map corresponding to the captured image. At 406, the processing server provides the object density map as output.

Object counting methods according to embodiments of the invention were utilized in experiments on three publicly available object counting data sets: TRANCOS of Guerrero-Gómez-Olmedo et al. (R. Guerrero-Gómez-Olmedo, B. Torre-Jiménez, R. J. López-Sastre, S. Maldonado-Bascón, and D. Oñoro-Rubio. Extremely overlapping vehicle counting. In Iberian Conference on Pattern Recognition and Image Analysis (IbPRIA), 2015), SHANGHAITECH of Zhang et al. (Yingying Zhang, Desen Zhou, Siqin Chen, Shenghua Gao, and Yi Ma. Single-image crowd counting via multi-column convolutional neural network. In CVPR, June 2016), and UCSD of Chan et al. (A.-B. Chan, Z.-S.-J. Liang, and N. Vasconcelos. Privacy preserving crowd monitoring: Counting people without people models or tracking. In CVPR, 2008).

We use Tensorflow to implement the proposed models. To train our models, we initialize all the weights with samples from a normal distribution with mean zero and standard deviation 0:02. We make use of the L2 regularizer with a scale value of $2.5 \times 10^5$ in all layers. To perform gradient decent we employ Adam (Diederik P. Kingma and Jimmy Ba. Adam: A method for stochastic optimization. 2015) with a learning rate of $10^{-4}$, $\beta_1$ of 0.9, and $\beta_2$ of 0:999. We train our solutions for $2 \times 10^5$ iterations, with mini-batches consisting of 128 image patches, which are extracted from a random image of the training set, such that 50% of the patches contain a centered object and the remaining patches are randomly sampled from the image. We perform data augmentation by flipping images horizontally with a probability of 0:5. All the pixel values from all channels are scaled to the range [0;1]. The ground truth of each dataset is generated by placing a normal distribution on top of each of the annotated objects in the image. The standard deviation σ of the normal distribution varies depending on the data set under consideration.

To perform the object count we feed entire images to our models. The proposed models are fully convolutional neural networks, therefore they are not constrained to a fixed input size. Finally, note that the presented models have significantly fewer parameters than most of the prior art methods. To analyze an image of size [640;480;3] with a GU-Net architecture, takes on average only 23 ms when executed in a NVIDIA GeForce 1080 Ti.

We use mean absolute error (MAE) and mean squared error (MSE) for the evaluation of the results on SHANGHAITECH and UCSD:

$$MAE = \frac{1}{N} \sum_{n=1}^{N} |c(F_w(x)) - c(y)|,$$

$$MSE = \sqrt{\frac{1}{n} \sum_{n=1}^{N} (c\ (F_w(x)) - c(y))^2}$$

where N is the total number of images, $c(F_w(x))$ represents the object count based on the density map output of the neural network, and $c(y)$ is the count based on the ground truth density map.

The Grid Average Mean absolute Error (GAME) metric is used to perform the evaluation with TRANCOS. According to this metric, each image has to be divided into a set of $4^S$ non-overlapping rectangles. When S=0 it is the entire image, when S=1 it is the four quadrants, and so on. For a specific value of S, the GAME(S) is computed as the average of the MAE in each of the corresponding $4^S$ subregions. Let $R_S$ be the set of image regions resulting from dividing the image into $4^S$ non-overlapping rectangles. Then, the GAME(S) is obtained as follows:

$$GAME(s) = \frac{1}{N}\sum_{n=1}^{N}\left(\frac{1}{|R_S|}\sum_{x \in R_S}|c(F_w(x)) - c(y)|\right)$$

This way, this metric provides a spatial measure of the error for S>0. Note that GAME(0) is simply the Mean Absolute Error (MAE).

TRANCOS is a publicly available dataset consisting of images depicting traffic jams in various road scenarios, and under multiple lighting conditions and different perspectives. It provides 1,244 images obtained from video cameras where a total of 46,796 vehicles have been annotated. It also includes a region of interest (ROI) per image.

For the experiments using this dataset, we follow the experimental setup of Guerrero-Gómez-Olmedo et al. to generate the ground truth density maps by setting the standard deviation of the normal distributions to S=10. We also perform a random gamma transformation to the images. We first use this dataset to evaluate the performance of the different possible operations (element-wise multiplication or summation, as well as a simple concatenation) for the operator of our learnable short-cut connections. Table 1 shows the results for the GU-Netarchitecture and all these operations.

TABLE 1

Fusion operation comparison for the GU-Net model in the TRANCOS dataset

| Model | GAME 0 | GAME 1 | GAME 2 | GAME 3 |
|---|---|---|---|---|
| Ex. Multiplication | 6.19 | 7.24 | 8.64 | 10.51 |
| Summation | 4.81 | 6.09 | 7.63 | 9.60 |
| Concatenation | 4.44 | 5.84 | 7.34 | 9.29 |

We observe that the element-wise multiplication, even though it produces accurate density maps, does not offer the best results. The summation is a linear operation that shows satisfying results. It also has the advantage that it does not add channels to the resulting features, making this type of operation suitable for situations in which memory consumption and processing capabilities are constrained. The best performing operation is the concatenation, hence, for the remainder of our experiments, we use it as the merging operation of the short-cut connections.

We now compare in Table 2 our solutions with the state-of-the-art in the TRANCOS data set. Shallow methods are listed in the upper part of the table. In the second part we find the deep learning methods. The last two rows show the results obtained by the U-Net and the GU-Net models.

TABLE 2

Results comparison for TRANCOS dataset

| Model | GAME 0 | GAME 1 | GAME 2 | GAME 3 |
|---|---|---|---|---|
| Reg. Forest | 17.77 | 20.14 | 23.65 | 25.99 |
| MESA | 13.76 | 16.72 | 20.72 | 24.36 |
| Hydra 3s | 10.99 | 13.75 | 16.69 | 19.32 |
| FCN-ST | 5.47 | — | — | — |
| CSRNet | 3.56 | 5.49 | 8.57 | 15.04 |
| U-Net | 4.58 | 6.69 | 8.69 | 10.83 |
| GU-Net | 4.44 | 5.84 | 7.34 | 9.29 |

Reg. Forest is described in Fiaschi et al. (Luca Fiaschi, Ullrich Köthe, Rahul Nair, and Fred A. Hamprecht. Learning to count with regression forest and structured labels. In ICPR, 2012), MESA is described in Lempitsky et al. (V. Lempitsky and A. Zisserman. Learning to count objects in images. In NIPS, 2010), Hydra 3s is described in Oñoro-Rubio et al. (Daniel Oñoro-Rubio and Roberto J. López-Sastre. Towards perspective-free object counting with deep learning. In ECCV, 2016), FCN-ST is described in Zhang et al. (Shanghang Zhang, Guanhang Wu, Joao P. Costeira, and Jose M. F. Moura. Understanding traffic density from large-scale web camera data. In CVPR, July 2017), and CSRNet is described in Li et al. (Yuhong Li, Xiaofan Zhang, and Deming Chen. Csrnet: Dilated convolutional neural networks for understanding the highly congested scenes. In CVPR, 2018).

Figure 5:
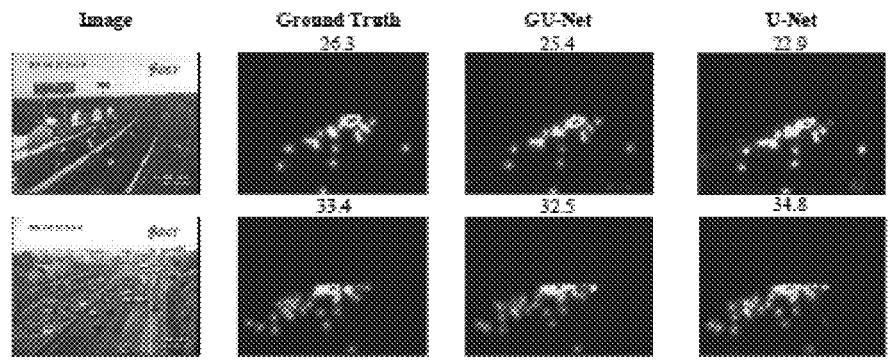
FIG. 5 qualitatively indicates results provided by an embodiment of the invention in an experiment.

First, our GU-Net achieves better results than the U-Net base architecture. The improvements are consistent across the different GAME settings used. This validates our hypothesis about the proposed learnable gating units. Second, in our analysis one can appreciate that the shallow methods are outperformed by deep learning based approaches. Among the deep models, the CSRNet gets the best performance for GAME(0) (or MAE). However, it reports high errors for GAME(2) and GAME(3). This indicates that the model is probably under-counting and over-counting in different regions of the image, but the count over the whole image compensates for the regional under- and over-counting. Overall, the best vehicle counting performance for both GAME(2) and GAME(3) is obtained by our GU-Net. FIG. 5 illustrates qualitative results of the proposed models.

Figure 6A:
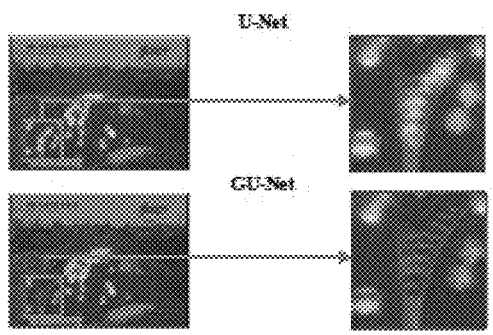
FIG. 6(a) provides a qualitative error analysis between results provided by a prior art neural network architecture and results provided by a neural network according to an embodiment of the invention.
Figure 6B:
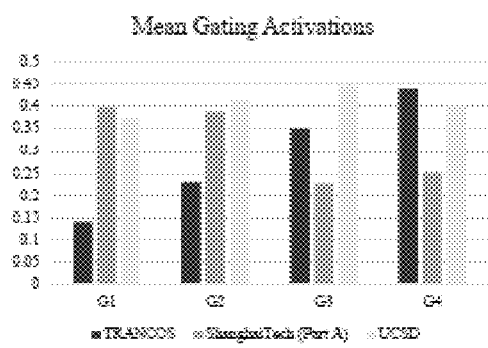
FIG. 6(b) provides mean activation scores of gating units according to embodiments of the invention across different experiments.

Adding learnable short-cut units helps to determine the strength of the information that is passed to the later construction layers. It actually increases the robustness of the final model by blocking information that is not relevant for these layers. Intuitively, in a deep convolutional neural network, the first layers learn low-level features such as edges, textures, or colors. The later layers are able to capture more complex feature patterns such as eyes, legs, etc. Therefore, when low-level features are combined with high-level features, the resulting feature map might contain irrelevant information, potentially adding noise. As an example, in FIG. 6(a) we present a situation that clearly shows how a low level texture is adding noise. The U-Net is confusing the road lines as cars while the GU-Net can efficiently handle the problem. Our learnable short-cut units learn to detect these situation and effectively block the forwarded information through the short-cut connections. To explore this hypothesis more thoroughly, we measure the mean values of the activation scalars (the output of the sigmoids) of the four learnable short-cut connections in the GU-Net for several data sets. FIG. 6(b) depicts the results of this experiment. It clearly shows that the effect of the shortcut units is data dependent, that is, the learnable shortcut units automatically adapt to the data set under consideration.

In addition to the previous experiments, we also include a detailed comparison of the UNet and GU-Net architectures using SHANGHAITECH and UCSD, two publicly available data sets for the problem of crowd counting.

SHANGHAITECH contains 1.198 annotated images with a total of 330.165 persons. The dataset consists of two parts: Part A contains images randomly crawled on the Internet, and Part B is made of images taken from the metropolitan areas of Shanghai. Both sets are divided into training and testing subsets, where: i) Part A contains 300 training images and 182 test images; ii) Part B consists of 400 training images and 316 test images. In addition to the standard sets, we have created our own validation set for each part, by randomly taking 50 images out of the training sets. We resize the images to have a maximum height or width of 380 pixels, and we generate the ground truth density maps by placing a Gaussian kernel on each annotated position with a standard derivation of S=4. We follow the training procedure described above.

Table 3(a) shows the results obtained for this dataset.

TABLE 3(a)

Crowd counting results for SHANGHAITECH dataset

| Model | Part A | | Part B | |
| --- | --- | --- | --- | --- |
| | MAE | MSE | MAE | MSE |
| Cross-scene | 181.8 | 277.7 | 32.0 | 49.8 |
| MCNN | 110.2 | 277.7 | 32.0 | 49.8 |
| CP-CNN | 73.6 | 106.4 | 20.1 | 30.1 |
| CSRNet | 68.2 | 115.0 | 10.6 | 16.0 |
| U-Net | 104.9 | 173.3 | 17.1 | 25.8 |
| GU-Net | 101.4 | 167.8 | 14.7 | 23.3 |

Cross-scene is described in Zhang et al. (Cong Zhang, Hongsheng Li, Xiaogang Wang, and Xiaokang Yang. Cross-scene crowd counting via deep convolutional neural networks. In CVPR, June 2015), MCNN is described in Zhang et al. (Yingying Zhang, Desen Zhou, Siqin Chen, Shenghua Gao, and Yi Ma. Single-image crowd counting via multi-column convolutional neural network. In CVPR, June 2016), and CP-CNN is described in Sindagai et al. (Vishwanath A. Sindagi and Vishal M. Patel. Generating high-quality crowd density maps using contextual pyramid cnns. In ICCV, 2017.)

In Table 3(a), one can again observe how the GU-Net improves the results of the standard U-Net baseline approach. In the Part A of the dataset, the CSRNet approach gets the best performance. It is followed by the CPCNN model. However, in Part B, CSRNet reports the lowest error, but it is followed by our models. Note that both CP-CNN and CSRNet approaches are based on or include the VGG16 architecture. While VGG16 has around 16.8 M of learnable parameters and is pretrained on Imagenet, our model, i.e. GU-Net, has only 2.8 M parameters and is not pretrained on any external dataset.

UCSD is a standard benchmark in the crowd counting community. It provides 2000 video frames recorded by a camera capturing a single scene. The images have been annotated with a dot on each visible pedestrian. As in previous work, we train the models on frames 601 to 1400. The remaining frames are used for testing. For our experiments we sample 100 frames uniformly at random from the set of training, and use them as our validation subset. To generate the ground truth density maps, we set the standard deviation of the normal distributions placed on the objects to s=5. To train our models, we follow the procedure described in section 5.1.

Table 3(b) shows the results for the UCSD data set.

TABLE 3(b)

Crowd counting results for UCSD dataset

| Model | MAE | MSE |
| --- | --- | --- |
| FCN-MT | 1.67 | 3.41 |
| Count-forest | 1.67 | 3.41 |
| Cross-scene | 1.6 | 5.97 |
| CSRNet | 1.16 | 1.47 |
| MCNN | 1.07 | 1.35 |
| U-Net | 1.28 | 1.57 |
| GU-Net | 1.25 | 1.59 |

FCN-MT is described in Zhang et al. (Shanghang Zhang, Guanhang Wu, Joao P. Costeira, and Jose M. F. Moura. Understanding traffic density from large-scale web camera data. In CVPR, July 2017) and Count-forest is described in Pham et al. (Viet-Quoc Pham, Tatsuo Kozakaya, Osamu Yamaguchi, and Ryuzo Okada. Count forest: Co-voting uncertain number of targets using random forest for crowd density estimation. In ICCV, December 2015).

Without hyper-parameter tuning, we are able to report state of the art results. Moreover, we observe how the GU-Net model consistently improves the U-Net. Our approaches are outperformed by CSRNet and MCNN models. However, note that our models are not pretrained, and that they are lighter in terms of parameters.

Embodiments of the invention provide improvements with respect to the prior art. Specifically, one or more embodiments of the invention can provide one or more of the following advantages:

1. A video stream is not required as input; instead, one or more still images can be provided as input. Not requiring video steams as input drastically reduces both the amount of information flowing through the neural network and the computational load thereby dramatically increasing the scalability of the system.
2. It is not necessary to calibrate the camera providing the input image(s). In contrast with prior art systems, one or more embodiments of the present invention do not require that a calibration be carried out to, e.g., determine a ground floor position, an object size, etc. Therefore, embodiments of the present invention can be deployed more easily.
3. Improved object counting accuracy on tested datasets as compared with prior art systems.
4. As compared to highway networks (which connect consecutive layers with a pair of learnable gating units such that the input of a next layer is the sum of a gated output of a previous layer and a gated output of the current layer), embodiments of the present invention connect and gate only the mirroring convolutional and deconvolutional layers of the network. Therefore, the gating units in the connections between consecutive layers (which are present in highway networks) are not required. Furthermore, embodiments of the present invention provide for improved object counting performance relative to highway networks—which are tailored for object classification.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for object density monitoring, the method comprising:
   receiving, by a processing server, an input image captured by an image sensor;
   providing an annotated dataset with a target object to be identified in the input image; and
   providing, by the processing server as output, an object density map generated from the input image,
   wherein the processing server provides the object density map by using a deep neural network having one or more pairs of a respective compression layer and a respective decompression layer connected by a respective gated shortcut,
   wherein each respective gated shortcut includes a respective gating function configured to receive, as input, an output of the respective compression layer and to generate, as output, gated information,
   wherein the gated information is generated by filtering the output of the respective compression layer, and
   wherein the respective decompression layer of each pair is configured to receive, as input, an output of a preceding neighboring layer and the gated information generated as output by the respective gating function.

2. The method according to claim 1, the object density map is a heat map that indicates a number of instances of the target object in different regions of the input image.

3. The method according to claim 1, further comprising, prior to the receiving, by the processing server, the input image captured by the at least one image sensor, training the deep neural network using the annotated dataset.

4. The method according to claim 3, wherein during the training the deep neural network using the annotated dataset, a connection strength of each of the one or more gated shortcuts is learned.

5. The method according to claim 1, wherein the output of the respective compression layer is a feature vector, and wherein the filtering the output of the respective compression layer to generate the gated information comprises multiplying the feature vector by a mask.

6. The method according to claim 5, wherein the mask is a sigmoid function of the feature vector and a set of learned weights.

7. The method according to claim 6, further comprising, prior to the receiving, by the processing server, the input image captured by the at least one image sensor, training the deep neural network using the annotated dataset,
   wherein the training the deep neural network using the annotated dataset includes learning the weights of the set of learned weights.

8. The method according to claim 1, further comprising providing a total count of a number of instances of the target object in the input image.

9. The method according to claim 1, wherein the image sensor is a camera and/or a microscope.

10. The method according to claim 1, wherein the image sensor is configured to provide a view of a target scene, further comprising providing a plurality of one or more additional image sensors configured to provide a view of the target scene.

11. The method according to claim 10, further comprising connecting the one or more additional image sensors to the processing server via the communication network;
   receiving, by the processing server, one or more additional input images captured by the one or more additional image sensors;
   providing, by the processing server as output, one or more additional object density maps, wherein each of the one or more additional object density maps is generated, by using the deep neural network, from a respective one of the one or more additional input images.

12. The method according to claim 11, further comprising providing a total count of a number of instances of the target object in the target scene by considering the object density map and each of the one or more additional object density maps.

13. The method according to claim 1, wherein the input image captured by the image sensor is a still image.

14. A non-transitory computer readable medium having stored thereon instructions for performing a method for object density monitoring, the method comprising:
   receiving, by a processing server, an input image captured by an image sensor;
   providing an annotated dataset with a target object to be identified in the input image; and
   providing, by the processing server as output, an object density map generated from the input image,
   wherein the processing server provides the object density map by using a deep neural network having one or more pairs of a respective compression layer and a respective decompression layer connected by a respective gated shortcut,
   wherein each respective gated shortcut includes a respective gating function configured to receive, as input, an output of the respective compression layer and to generate, as output, gated information,
   wherein the gated information is generated by filtering the output of the respective compression layer, and
   wherein the respective decompression layer of each pair is configured to receive, as input, an output of a preceding neighboring layer and the gated information generated as output by the respective gating function.

15. A system for object density monitoring, the system comprising:
  a processing server configured to:
    receive an input image from an image sensor,
    receive an annotated dataset with a target object to be identified in the input image, and
    provide, as output, an object density map generated from the input image, wherein the processing server provides the object density map by using a deep neural network having one or more pairs of a respective compression layer and a respective decompression layer connected by a respective gated shortcut,
  wherein each respective gated shortcut includes a respective gating function configured to receive, as input, an output of the respective compression layer and to generate, as output, gated information,
  wherein the gated information is generated by filtering the output of the respective compression layer, and
  wherein the respective decompression layer of each pair is configured to receive, as input, an output of a preceding neighboring layer and the gated information generated as output by the respective gating function.

16. The method according to claim 1, wherein the output of the respective compression layer is a feature vector, wherein the gated information is a tensor, and wherein the tensor is merged with the output of the preceding neighbor layer so as to provide the input of the respective decompression layer.

17. The method according to claim 16, wherein the tensor is merged with the output of the preceding neighbor layer by way of concatenation or summation.

18. The method according to claim 6, wherein the gated information is a tensor, and wherein the tensor is merged with the output of the preceding neighbor layer so as to provide the input of the respective decompression layer.

19. The method according to claim 3, wherein the training the deep neural network includes minimizing a squared difference between an output of the deep neural network for a given input image and a predetermined density map for the given input image.

20. The method according to claim 19, wherein the training the deep neural network is performed using only a single loss term.

* * * * *